US011443439B1

(12) United States Patent
Banks et al.

(10) Patent No.: US 11,443,439 B1
(45) Date of Patent: Sep. 13, 2022

(54) AUTO SIMULTANEOUS REFERENCING AIR-TO-AIR BACKGROUND ORIENTED SCHLIEREN

(71) Applicant: U.S.A. as Represented by the Administrator of NASA, Washington, DC (US)

(72) Inventors: Daniel W Banks, Carmichael, CA (US); James T Heineck, San Jose, CA (US)

(73) Assignee: U.S.A. as Represented by the Administrator of the National Aeronautics and Space Administration, Washington, DC (US)

( * ) Notice: Subject to any disclaimer, the term of this patent is extended or adjusted under 35 U.S.C. 154(b) by 201 days.

(21) Appl. No.: 16/820,197

(22) Filed: Mar. 16, 2020

Related U.S. Application Data

(60) Provisional application No. 62/818,533, filed on Mar. 14, 2019.

(51) Int. Cl.
*G06T 7/246* (2017.01)
*G06T 7/30* (2017.01)

(52) U.S. Cl.
CPC ............... *G06T 7/248* (2017.01); *G06T 7/30* (2017.01); *G06T 2207/10032* (2013.01)

(58) Field of Classification Search
CPC ......... G01N 21/455; G06T 7/248; G06T 7/30; G06T 2207/10032; G06T 7/20–292; G06T 2207/20021; G06T 2207/30212

USPC .................................................. 382/107, 294
See application file for complete search history.

(56) References Cited

U.S. PATENT DOCUMENTS

| | | | |
|---|---|---|---|
| 3,693,015 | A | 9/1972 | Funk, Jr. |
| 5,534,995 | A | 7/1996 | Weinstein |
| 9,599,497 | B1 | 3/2017 | Haering, Jr. et al. |
| 2006/0262324 | A1 | 11/2006 | Hays et al. |
| 2014/0267781 | A1 | 9/2014 | Buckner et al. |
| 2014/0340502 | A1 | 11/2014 | Freeman et al. |
| 2017/0082124 | A1 | 3/2017 | Kremeyer |
| 2017/0315564 | A1* | 11/2017 | Thomas ................. G05D 1/104 |

OTHER PUBLICATIONS

Heineck, James T., et al. "Background oriented schlieren (BOS) of a supersonic aircraft in flight." AIAA flight testing conference. 2016. (Year: 2016).*

(Continued)

*Primary Examiner* — Geoffrey E Summers

(57) ABSTRACT

An air-to-air background-oriented schlieren system in which reference frames are acquired concurrently with the image frames, recording a target aircraft from a sensor aircraft flying in formation, while concurrently recording reference frames of underlying terrain to provide a visually textured background as a reference. This auto-referencing method improves the original AirBOS method by allowing a much more flexible and useful measurement, reducing the flight planning and piloting burden, and broadening the possible camera choices to acquire imaging of visible density changes in air that cause a refractive index change by an airborne vehicle.

23 Claims, 5 Drawing Sheets

(56) References Cited

OTHER PUBLICATIONS

Bauknecht, André, et al. "Blade-tip vortex detection in maneuvering flight using the background-oriented schlieren technique." Journal of Aircraft 51.6 (2014): 2005-2014. (Year: 2014).*
"Schlieren Images Reveal Supersonic Shock Waves." Aug. 25, 2015. NASA. (Year: 2015).*
"Hardware and Software for Air-to-Air Schlieren Imaging." NASA Tech Briefs. Jan. 1, 2002.<https://www.techbriefs.com/component/content/article/tb/pub/briefs/photonics/2278>. (Year: 2002).*
Gipson, Lillian. "F-18 Aircraft Dive into Sonic Boom Tests." NASA. Aug. 7, 2017. <https://www.nasa.gov/aeroresearch/tech-excellence/2009/f-18-aircraft-dive-into-sonic-boom-tests>. (Year: 2017).*
Banks, D., "Fundamental Aeronautics Program! Supersonics Project", Technical Presentation; National Aeronautics and Space Administration; Dryden Flight Research Center, Mar. 2011, pp. 1-18, Technical Conference, Cleveland, OH.
Hargather, M.J. et al, "Natural-background-oriented schlieren imaging", Exp Fluids, Jul. 2009, pp. 1-10.
Raffel, Markus, "Background-oriented schlieren (BOS) techniques", Exp Fluids (2015) 56:60, pp. 1-17.
Richard, H. et al. "Background oriented schlieren demonstrations", Final Report No. 8963-AN-015, May 2001, pp. 1-37—(European Research Office, Edison House, Old Marylebone Road, London NW15th, United Kingdom).

\* cited by examiner

AUTO SIMULTANEOUS REFERENCING AIR-TO-AIR BACKGROUND ORIENTED SCHLIEREN

CROSS-REFERENCE TO RELATED APPLICATIONS

The present application derives priority from U.S. provisional patent application Ser. No. 62/818,533 filed on 14 Mar. 2019.

STATEMENT OF GOVERNMENT RIGHTS

The invention described herein was made in the performance of work under a NASA program and by an employee of the United States Government and is subject to the provisions of Section 20135(b) of the National Aeronautics and Space Act (51 U.S.C 20135(b)), as amended, Public Law 85-568 (72 Stat. 435, 42 U.S.C. § 2457), and may be manufactured and used by or for the Government for government purposes without payment of any royalties thereon or therefore.

BACKGROUND OF THE INVENTION

1. Field of the Invention

The present invention relates to an imaging technique for visibly rendering density changes in air caused by an airborne vehicle and, more particularly, to an auto-referencing air-to-air Background Oriented Schlieren Technique for visualizing supersonic flow phenomena with full-scale aircraft in flight.

2. Description of the Background

Air-to-air background-oriented schlieren (AirBOS) was developed to obtain high spatial resolution images of shock waves and other density changing flow phenomena, inflight on real aircraft. It is beneficial to observe and measure these phenomena, in conjunction with airframe data, to determine what is actually happening to an aircraft to compare to predictions and design.

In traditional AirBOS as described in the present inventor's U.S. Pat. No. 10,169,847 issued Jan. 1, 2019, a sensor aircraft is equipped with a high-speed visible spectrum camera. The sensor aircraft travels at low airspeed on a predetermined route and on a level altitude over a background having sufficient visual detail, contrast, and consistent exposure. A target aircraft travels the same predetermined route, but at an altitude between the sensor aircraft and the ground (background), such that the target aircraft passes beneath the sensor aircraft. The camera on the sensor aircraft captures a series of images including: 1) a reference image, or series of reference images, taken immediately before the target aircraft enters the image frame; and 2) a series of data images as the target aircraft passes through the image frame. The data images are processed to calculate density gradients around the target aircraft. These density gradients include shockwaves, vortices, engine exhaust, and Mach wave radiation. Air density gradients cause a refractive index change in the fluid that can cause a slight distortion in the background pattern of the data image. Image processing that compares the data image(s) to the reference image(s) yields the difference caused by the density gradient.

Previously AirBOS required a relatively high frame rate and relatively high target aircraft over-take velocity for optimum results. Also, difficulty in obtaining off vertical images was a major limitation due to the fixed nadir view of the installation.

The present invention provides a system and method for concurrent "auto-referencing" in the application of AirBOS that makes it practical to obtain data without requiring any overtake by the target aircraft, which facilitates easier off-axis data collection, and which relaxes the necessity of high-speed (frame rate) cameras, thus expanding the options for high-resolution cameras that are limited in frame rate.

SUMMARY OF THE INVENTION

It is, therefore, an object of the present invention to provide a new, more practical auto-referencing AirBOS technique for visualizing supersonic flow phenomena with full-scale aircraft in flight.

It is another object to provide an auto-referencing AirBOS technique that facilitates off-axis data collection by simplifying the flight planning and piloting requirements.

It is still another object to provide an auto-referencing AirBOS technique that reduces the need for high-speed cameras and expands the possibilities for high-resolution, low frame rate cameras which can provide higher resolution schlieren imagery.

According to the present invention, the above-described and other objects are accomplished by a method and system for visibly rendering density changes in air caused by an airborne vehicle. The method generally comprises:

flying a target aircraft at a predetermined airspeed and altitude over a natural background;

flying a sensor aircraft in formation with said target aircraft at an airspeed and altitude chosen to depict a 'wake' of interest from said target aircraft (the term wake herein meaning a disturbance or set of disturbances generated by an aircraft moving through the air);

capturing a series of paired images from said sensor aircraft, including a reference image, or series of images, of a portion of the background taken before the target aircraft flies over that same portion of the background, and a target image of the target aircraft in said portion of the background;

associating each reference image(s) and target image(s); and processing the series of images by the substeps of, analyzing the target and reference images to compute displacements of background detail caused by refractive wake features, and rendering visible density changes in the air in said target images. The processing is implemented by a processor and software that correlates the series of pairs of target and reference images and mathematically compares the images to compute the background distortion caused by density changes in the air and thus visualizing the aircraft flow features.

The invention makes it practical to obtain data without requiring any overtake by the target aircraft, which facilitates easier off-axis data collection, and which reduces the need for very high-speed cameras.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

According to embodiments of the present invention, an improved auto-referencing air-to-air background-oriented schlieren (AirBOS) technique is herein disclosed for visualizing supersonic flow phenomena with full-scale aircraft in flight. In an embodiment, the sensor aircraft flies in formation at the same speed with the target aircraft and continuously takes both data frames and reference frames, concurrently imaging the reference frames typically one frame in advance of the target aircraft. The individual data frames of the target aircraft are paired with either a single or a series of reference frames. This auto-referencing AirBOS technique eliminates the need for overtake by the target aircraft, greatly simplifies the acquisition process, facilitates easier off-axis data collection, and reduces the need for very high-speed cameras, which tend to have limited resolution, and thus expands the possibility of using high-resolution, lower frame rate cameras. In addition, eliminating the need for high speed overtaking by the target aircraft reduces pilot workload and enhances mission safety.

Figure 1:
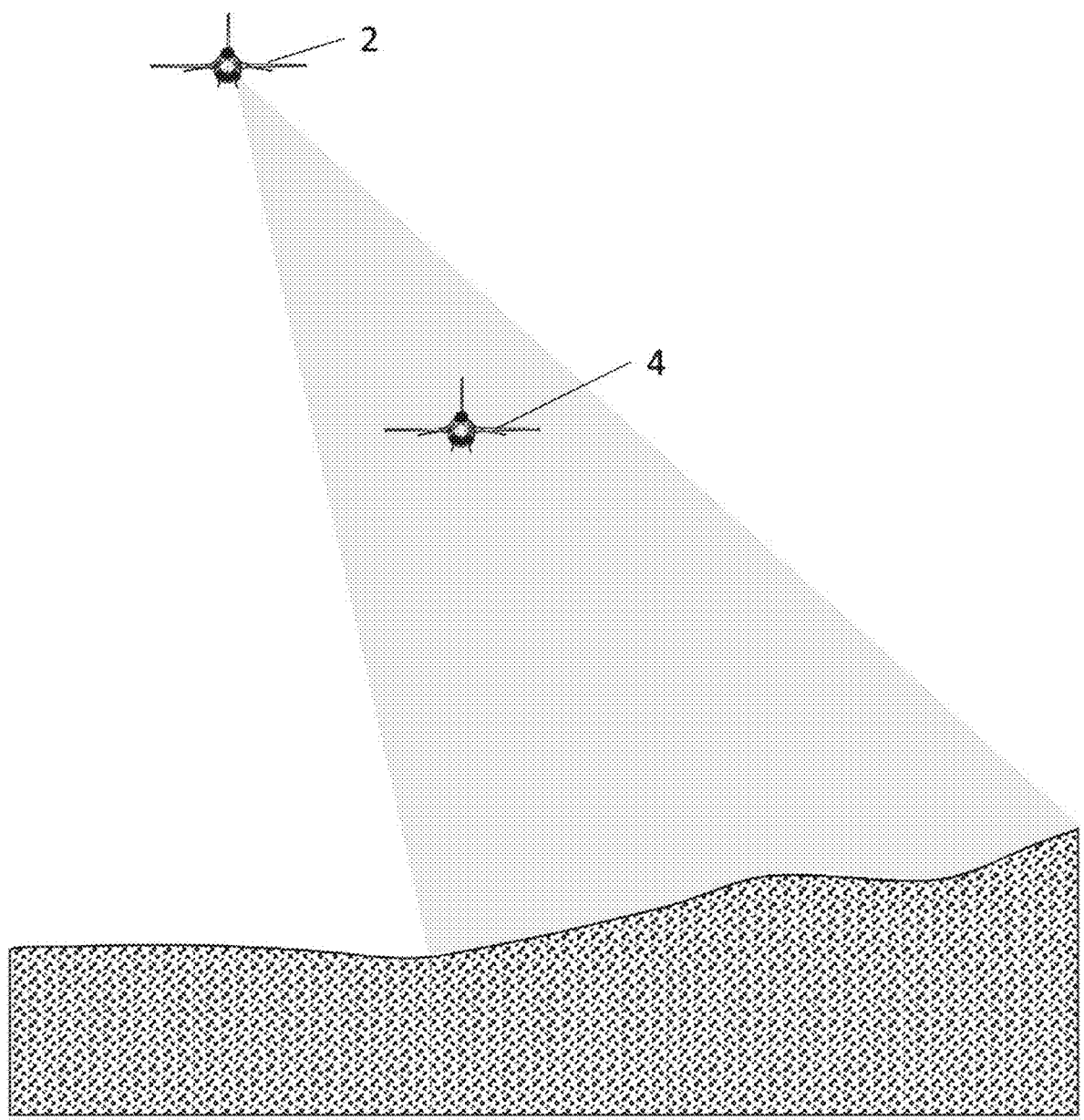
FIG. 1 is a front perspective view of an auto-referencing AirBOS technique for visualizing supersonic flow phenomena according to the invention.

FIG. 1 is a front-view perspective of the auto-referencing AirBOS technique according to the present invention, which generally comprises observing and recording a target aircraft 4 from a sensor aircraft 2 flying in formation, while concurrently recording underlying terrain to provide a visually textured background as a reference. Though FIG. 1 shows the sensor aircraft 2 flying overhead of the target aircraft 4, the present technique does not require this. The sensor aircraft 2 may be at co-altitude or even below the target aircraft 4 in some circumstances, depending on data collection goals.

Figure 2:
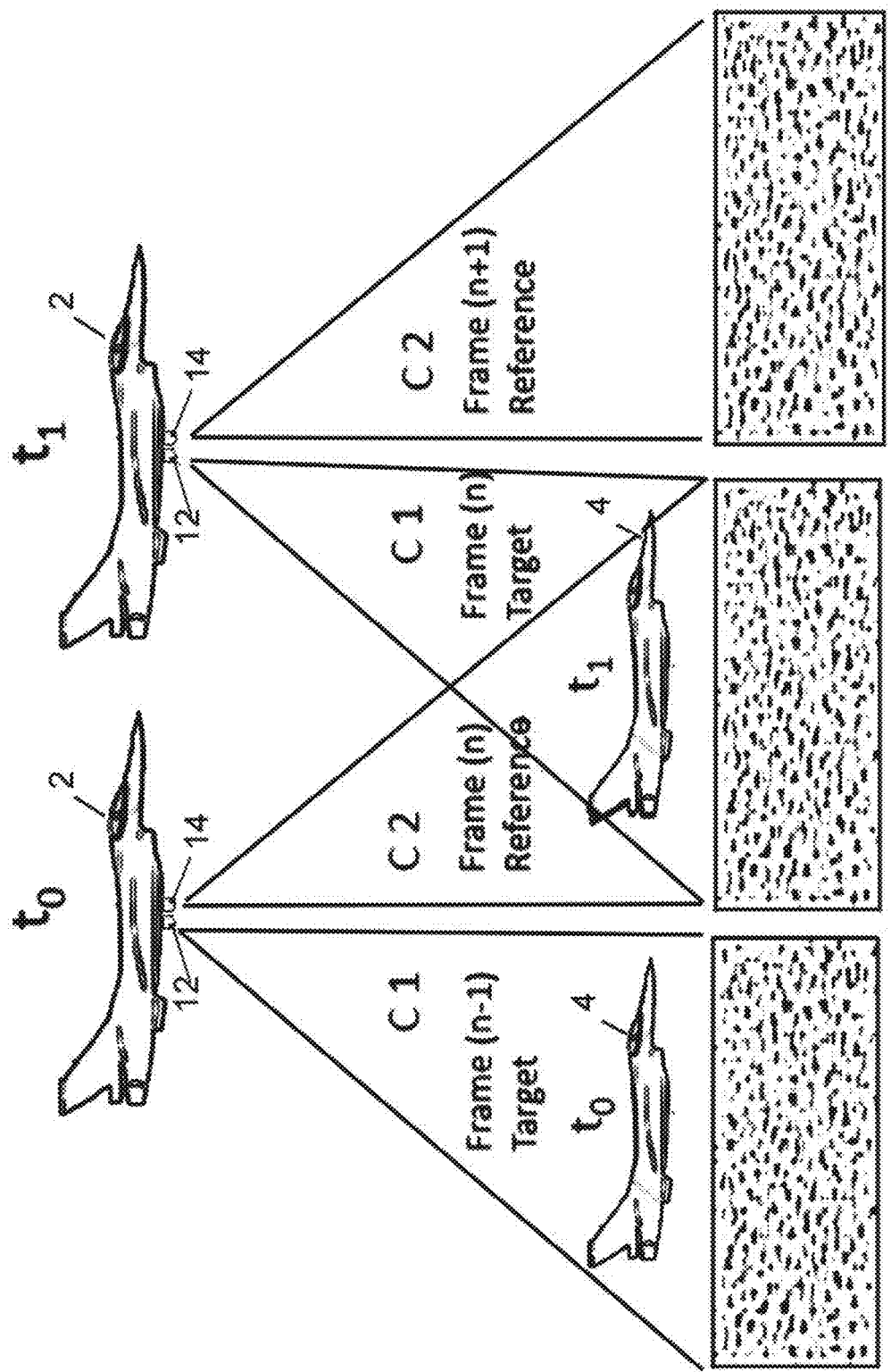
FIG. 2 is a side perspective view of the auto-referencing AirBOS technique of FIG. 1.

FIG. 2 is a side-view perspective of the technique. In this embodiment a first data acquisition camera(s) 12 and reference camera(s) 14 in the sensor aircraft 2 is mounted for a nadir-view of the target aircraft 4. Unlike traditional AirBOS the present technique is not limited to a nadir view, but can be any orientation to provide any desired vertical or non-vertical viewing angle, such as a side view vis-a-vis an oblique viewing angle to allow quasi-tomographic views.

A separate second reference camera 14 field of view is framed just forward of the data acquisition camera 12 field of view. Importantly, the sensor aircraft 2 travels at the same speed as target aircraft 4 such that it remains in the field of view of camera 12 throughout the image acquisition time. At time to the sensor aircraft 2 concurrently takes one data frame $F_{T(n-1)}$ of the target aircraft 4 and one reference frame $F_{R(n)}$ of unobstructed background terrain just ahead of the target aircraft 4 frame. At time ti the sensor aircraft 2 concurrently takes one data frame $F_{T(n)}$ of the target aircraft 4 and one reference frame $F_{R(n+1)}$ of unobstructed background terrain just ahead of the target aircraft 4 frame. Preferably, both cameras 12, 14 in the sensor aircraft 2 are oriented in accordance with the speed of the sensor aircraft 2 and frame rate of the cameras 12 to ensure that the field-of-view (FOV) of the reference camera 14 during each frame becomes the same FOV of the data acquisition camera 12 in the next successive frame. In practice, the background image in the field-of-view (FOV) of the reference camera 14 needs to shift frame-to-frame by as few as five pixels in order to leverage the multi-reference technique described herein. In reality the speed of the aircraft 2, 4 may not synchronize exactly to the frame rate; however, this can be compensated for by software frame registration (described below) and other processes.

The image acquisition process continues to time $t_n$, and in each time increment the sensor aircraft 2 concurrently takes one data frame $F_T$ of the target aircraft 4 and one reference frame $F_R$ of unobstructed background terrain just ahead of the target aircraft 4 frame. Preferably, each reference frame $F_{R(n)}$ of unobstructed background terrain and each data frame $F_T$ are tagged with a unique identifier and each identified data frame $F_{T(n-1)}$ is correlated to its corresponding data frame $F_{T(n-1)}$.

Figure 3:
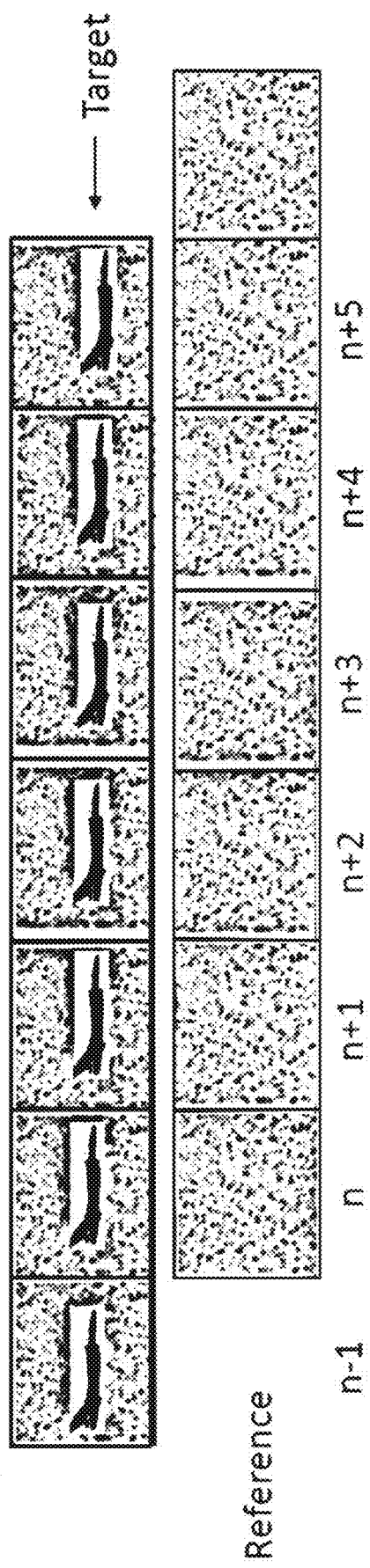
FIG. 3 shows an imaging sequence.

As seen in FIG. 3, the foregoing process results in a sequence of target frames $F_{T1}$, $F_{T2}$ . . . $F_{TN}$, and a corresponding sequence of unobstructed background reference frames $F_{R2}$, $F_{R3}$, $F_{R(N+1)}$ each reference frame correlated to its corresponding data frame.

One skilled in the art should understand that the above-described dual-imaging technique can also be accomplished with a single camera configured for imaging a divided focal plane, where one part of the focal plane is used for acquisition of the data images and part is used for the reference images. In this case the single camera concurrently images the target aircraft and a part of the frame of the data camera forward of the nose of the target aircraft. Further, it can also be accomplished with the same undivided focal plane as that acquiring the data images, but requires additional data processing algorithms. It should also be understood that cameras 12, 14 need not be configured to obtain visual spectrum images. It is contemplated that images may be obtained anywhere that the electromagnetic waves used for imaging refract in air enough to allow background distortions to be spatially resolved. Typically this would be within a range of wavelengths from 350 nm to 12 microns.

In all such cases reference data is acquired separately and concurrently with data acquisition, but each reference frame is concurrently taken one (or more) frames in advance of the target aircraft. The reference image advances with the target image. This allows the sensor aircraft 2 to fly in close formation with the target aircraft 4. Each imaged reference frame is paired with each imaged data frame, as opposed to a set of reference frames being used for the entire set of data from that pass as per prior AirBOS systems. Multiple reference frames could be obtained for each target frame by having multiple sensors (or segments of sensors) each nominally one frame ahead (but not necessarily) of the other (t+1, t+2, etc.). Each of these reference frames would need to be linked with the associated data frame.

The present system employs a computer system inclusive of processor and software to process the data images with the reference images to obtain the schlieren images. An additional goal is near real-time in-situ processing, which currently favors a dedicated computer but processing can possibly be done in-situ (using existing sensing aircraft 2 data acquisition equipment) if enough computer resources were available.

Figure 4:
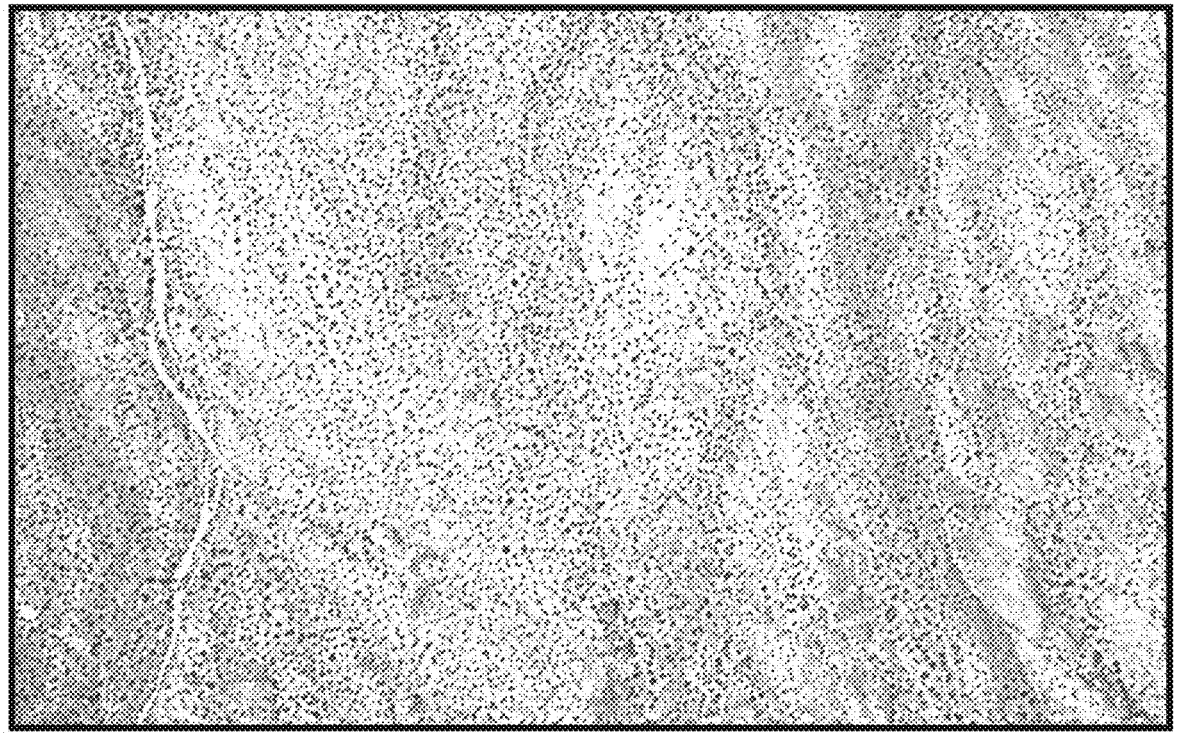
FIG. 4 is an exemplary reference image.

FIG. 4 is a screen shot of a reference image.

Figure 5:
FIG. 5 is an exemplary target image.

FIG. 5 is an exemplary target image.

Figure 6:
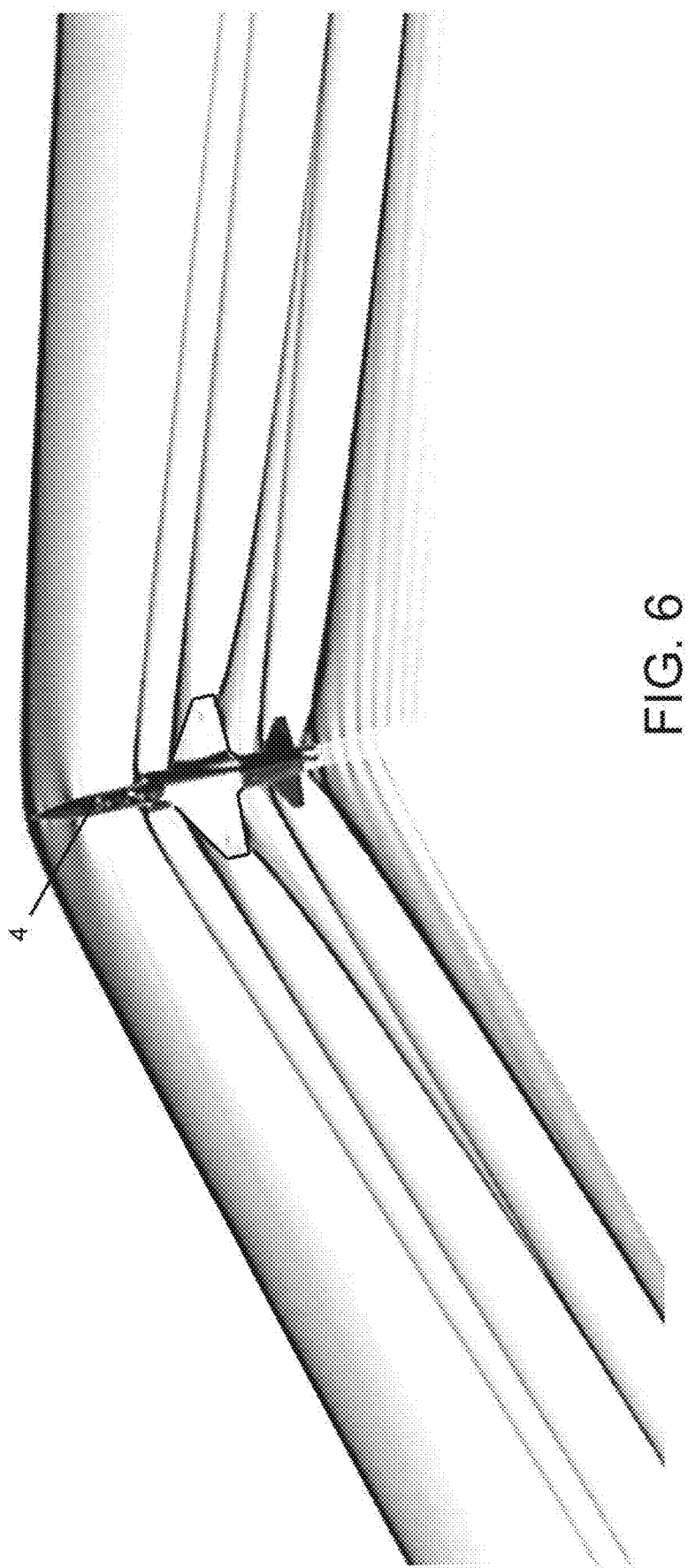
FIG. 6 is an exemplary composite schlieren image showing the major shock structure generated by the target airplane 4, with an overlay of the target airplane 4 placed onto the image.

FIG. 6 is an exemplary composite schlieren image showing the major shock structure generated by the target airplane 4, with the target airplane 4 placed onto the image. Image processing is used to visualize the shock waves (density gradient) in the data images relative to the reference image as described below and ultimately render FIG. 6.

The flight profiles and estimated Fields of View predicted with cameras 12, 14 are consistent with those set forth in the present inventor's U.S. Pat. No. 10,169,847 issued Jan. 1, 2019, except that the sensor aircraft 2 flies in formation with the target aircraft 4 rather than an intercept pattern both along a single pre-determined course line. Again, determining the optimal aircraft altitudes and angles is a balance between aircraft performance, ground vegetation detail, the apparent sizes of the aircraft, and the largest possible viewing area for the target airplane 4 to pass through. Some ground vegetation shadowing is preferable to increase contrast of the vegetation against the terrain. Vegetation is one example of a useful natural background. Others useful natural backgrounds include, but are not limited to; ocean glint, mountains, horizon, clouds, and other visible atmospheric phenomena. Any background, natural or synthetic, that has sufficient texture to allow the displacement of features to be spatially resolved can be successfully used.

Image processing algorithms are used to determine the pixel shift of the background. Pixel shift is correlated with change of index of refraction and consequently the change in density and shockwave location. In an embodiment, several steps of image processing were required to produce a schlieren image. The initial step was determining which of numerous passes were the most appropriate to process. On some passes the target airplane did not enter the camera view; other passes were over areas of the desert with sparse plant density. Preferably, aircraft remain in formation such that there is relatively little movement relative to each other. However, some movement may be expected and "frame registration" may be used to compensate. Specifically, each image of the sequence of images may be registered to the first image in the sequence by applying a transformation as shown in equations (1) and (2) of the present inventor's U.S. Pat. No. 10,169,847 issued Jan. 1, 2019, where (x0, y0) are pixel coordinates in the first image and (x, y) are the corresponding pixel coordinates in the current image. Once the images are registered, local displacements of the background due to disturbances created by the test airplane are determined either a cross-correlation algorithm, direct correlation algorithm, an optical flow algorithm or any combination of these. The result of this process is a data array for each image pair, where each node of the array has the displacements Dx and Dy, which corresponds to the displacement in the horizontal and vertical direction in the image. The nodes may correspond to every pixel in the image or some reduced resolution. The processing may be implemented by a processor and software that correlates the series of pairs of target and reference images and mathematically compares the images. For example, processing may comprise a finite element analysis including the substeps of:

acquiring a sequence of data relevant to a flight condition;

compiling a data array of displacement data from the sequence of data;

mathematically averaging at the displacement data in the data array each node;

mathematically determining the vector displacement in an arbitrary direction at each node; and mathematically determining the absolute magnitude of a displacement at each node.

FIG. 6 includes an overlay of the target airplane 4 placed onto the image, because the airplane image is typically lost due to the image processing algorithm used to determine the displacements. The image shown in FIG. 6 clearly shows the major shock structure generated by the airplane, including the over-wing expansion and shock around the canopy. One can see where the weaker shocks coalesce with the stronger shock in the far field.

It has been found that closer flights (those having less vertical separation between sensor aircraft 2 and target 4) produce images with more spatial resolution. However, even with significant vertical separation the shockwaves persist through the end of the frame without much apparent attenuation. There is some expected spreading of the features, most notably the apparent expansion region from the wing upper surface.

It should now be apparent that the above-described technique allows for co-speed data acquisition, and as such accommodates a more diverse set of aircraft/flight Mach numbers, or other flight conditions per "run." The technique works during acceleration or other non-steady maneuvers, and accommodates aircraft configuration changes (aileron, rudder). Moreover, as stated above camera's 12, 14 can be oriented at different viewing angles, e.g., non-vertical, to provide quasi tomographic views of same condition. The camera angle may be side looking for oblique viewing. The technique is also better suited for low-speed applications than traditional AirBOS.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A method for discerning density changes in air caused by an airborne vehicle, the method comprising the steps of:

flying a target airborne vehicle at a predetermined airspeed and altitude over a background;

flying a sensor airborne vehicle in formation with said target airborne vehicle at an airspeed and altitude such that said target airborne vehicle remains fixed in a field-of-view of a target sensor and such that refractive wake features of said target airborne vehicle are included within said field-of-view of said target sensor;

capturing a series of image pairs from said sensor airborne vehicle, each image pair including a reference image of said background taken in advance of said target airborne vehicle such that said reference image is undisturbed by said target airborne vehicle, and a target image taken with said target airborne vehicle over said background;

for each image pair, time shifting said reference image to adjust for a time delay relative to said target image; and processing the series of image pairs by analyzing comparative displacement of features in said background between said time-shifted reference images and said target images as a result of said target airborne vehicle's refractive wake features.

2. The method for discerning density changes in air according to claim 1, wherein said processing step comprises a substep of mathematically comparing, for at least one of said image pairs, said target image and said time-shifted reference image and calculating displacements of background detail caused by said refractive wake features.

3. The method for visualizing density changes in air according to claim 2, wherein said processing step comprises the substeps of acquiring a sequence of data relevant to a flight condition, compiling a data array of displacement data from said sequence of data, mathematically averaging at each node the displacement data in the data array;

mathematically determining vector of displacement at each node in any arbitrary direction, and mathematically determining at each node an absolute value of displacement.

4. The method for discerning density changes in air according to claim 3, wherein said processing step further comprises a substep of rendering an averaged image of visible density changes in the air.

5. The method for discerning density changes in air according to claim 1, wherein said processing step further comprises a substep of rendering a composite image of visible density changes in the air.

6. The method for discerning density changes in air according to claim 1, wherein said step of capturing a series of image pairs from said sensor airborne vehicle further comprises capturing said series of images when said sensor airborne vehicle is flying above said target airborne vehicle.

7. The method for discerning density changes in air according to claim 1, wherein said step of capturing a series of image pairs from said sensor airborne vehicle further comprises capturing said series of images when said sensor airborne vehicle is flying below said target airborne vehicle.

8. The method for discerning density changes in air according to claim 1, wherein said step of capturing a series of image pairs from said sensor airborne vehicle further comprises capturing said series of images when said sensor airborne vehicle is flying at an oblique angle to said target airborne vehicle relative to said background.

9. The method for discerning density changes in air according to claim 1, wherein said step of capturing a series of image pairs from said sensor airborne vehicle further comprises capturing said series of images when said sensor airborne vehicle is flying at a co-altitude to said target airborne vehicle relative to said background.

10. The method for discerning density changes in air according to claim 1, wherein said step of capturing a series of image pairs from said sensor airborne vehicle further comprises using multiple cameras to capture each image pair.

11. The method for discerning density changes in air according to claim 1, wherein said step of capturing a series of image pairs from said sensor airborne vehicle further comprises, for each image pair, a single camera capturing both said target image and said reference image, wherein said camera captures said target image and said reference image by partitioning each camera frame into a first segment for said target image and a second segment for said reference image.

12. The method for discerning density changes in air according to claim 1, wherein said step of capturing a series of image pairs from said sensor airborne vehicle further comprises, for each image pair, capturing said target image from a first camera operating as said target sensor and capturing said reference image from a second camera.

13. The method of claim 1, wherein the target airborne vehicle is supersonic and the sensor airborne vehicle is supersonic.

14. A system for imaging density changes in air caused by a moving target, comprising:

a target airborne vehicle flying at a predetermined airspeed and altitude over a background;

a sensor airborne vehicle comprising a target sensor and flying in formation with said target airborne vehicle at an airspeed and altitude such that said target airborne vehicle remains fixed in a field-of-view of said target sensor and such that refractive wake features of said target airborne vehicle are included within said field of view of said target sensor; and a computer system, wherein said target sensor is configured to capture a series of image airs from said sensor airborne vehicle, each image pair including a reference image of said background taken in advance of said target airborne vehicle such that said reference image is undisturbed by said target airborne vehicle, and a target image taken with said target airborne vehicle over said background, and wherein said computer system is configured to:

for each image pair, time shift said reference image to adjust for a time delay relative to said target image; and process the series of image pairs by analyzing comparative displacement of features in said background between said time-shifted reference images and said target images as a result of said target airborne vehicle's refractive wake features.

15. The system of claim 14, wherein said computer system is further configured to, when processing the series of image pairs, mathematically compare the target images and the reference images and calculate displacements of background detail caused by refractive wake features.

16. The system of claim 14, wherein said computer system is further configured to analyze comparative displacement of features in a plurality of target images relative to their paired reference images.

17. The system of claim 16, wherein said computer system is further configured to average the displacement features.

18. The system of claim 17, wherein said computer system is further configured to render a composite image of visible density changes in the air.

19. The system of claim 18, wherein said target sensor comprises a single camera that captures both the target image and the reference image for each image pair, wherein said camera captures said target image and said reference image by partitioning each camera frame into a first segment for said target image and a second segment for said reference image.

20. The system of claim 19, wherein said computer system is further configured to analyze comparative displacement of features by applying one or combination of a cross-correlation algorithm, direct correlation algorithm, and optical flow algorithm.

21. The system of claim 14, wherein said computer system is further configured to analyze comparative displacement of features by analyzing displacement of features in a target image relative to a plurality of corresponding reference frames.

22. The system of claim 14, wherein the target airborne vehicle is supersonic and the sensor airborne vehicle is supersonic.

23. The system of claim 14, wherein said target sensor comprises multiple cameras.

* * * * *